United States Patent [19]

Sherman et al.

[11] Patent Number: 5,141,357
[45] Date of Patent: Aug. 25, 1992

[54] MISALIGNMENT COMPENSATING FASTENER INSERT

[75] Inventors: William D. Sherman, Hampshire; Timothy S. Konicek, Rockford, both of Ill.

[73] Assignee: Sundstrand Corp., Rockford, Ill.

[21] Appl. No.: 639,238

[22] Filed: Jan. 9, 1991

[51] Int. Cl.$^5$ .............................................. F16D 1/00
[52] U.S. Cl. ............................... 403/408.1; 403/409.1; 403/4
[58] Field of Search ............... 403/4, 408.1, DIG. 8, 403/409.1, 388, 367, 3, 351

[56] References Cited

U.S. PATENT DOCUMENTS

| | | | |
|---|---|---|---|
| 1,097,185 | 5/1914 | Oehrle . | |
| 1,704,393 | 3/1929 | Grauel . | |
| 2,216,208 | 10/1940 | Michon | 403/DIG. 8 |
| 3,385,624 | 5/1968 | Baclini | 403/4 X |
| 3,866,938 | 2/1975 | Boyd et al. | 280/96.2 B |
| 4,420,272 | 12/1983 | Ingalls et al. | 403/4 |
| 4,561,796 | 12/1985 | Hanaoka | 403/4 |
| 4,830,529 | 5/1989 | Bildtsen | 403/4 |

FOREIGN PATENT DOCUMENTS

| | | | |
|---|---|---|---|
| 817675 | 6/1975 | Australia . | |
| 1191632 | 11/1985 | U.S.S.R. | 403/408.1 |

Primary Examiner—Andrew V. Kundrat
Attorney, Agent, or Firm—Antonelli, Terry, Stout & Kraus

[57] ABSTRACT

A misalignment compensating fastener insert for adjusting the location of a fastener to compensate for misalignment in attachment holes of articles to be assembled. The misalignment compensating fastener insert includes a truncated cone shaped outer body member having an eccentric tapered inner bore and a truncated cone shaped inner body member having an eccentric inner bore. The truncated cone shaped inner body member is rotatably positioned within the tapered inner bore of the truncated cone shaped outer body member which is rotatably positioned in a tapered attachment hole of a first article to be assembled. A second article to be assembled includes a cylindrical attachment hole corresponding to the tapered attachment hole. Adjusting the eccentricity of the inner bore of the truncated cone shaped inner body member relative to the truncated cone shaped outer body member compensates for misalignments between the attachment holes. The eccentricity is adjusted by rotating the truncated cone shaped inner body member and the truncated cone shaped outer body member relative to each other thereby aligning the inner bore with the cylindrical attachment hole.

3 Claims, 2 Drawing Sheets

MISALIGNMENT COMPENSATING FASTENER INSERT

TECHNICAL FIELD

The present invention relates to misalignment compensating fastener inserts for compensating for misalignment in the attachment holes of articles to be assembled. More particularly, the present invention relates to a misalignment compensating fastener insert for compensating for misalignments in the attachment holes of articles to be assembled by permitting the rotation of an inner body member, having an eccentric bore, and a rotatable outer body member relative to each other to compensate for misalignments in the attachment holes of the articles to be assembled. The inner body member is carried in an eccentric bore of the outer body. Further, the present invention provides for the positive transference of shear loading at the attachment points in the articles to be assembled.

BACKGROUND ART

Many designs require close tolerances in attachment hole alignment at attachment points in articles to be assembled to achieve proper fit of the articles and insure the proper transference of shear loads at the attachment points. In general, close tolerance hole fabrication and inspection thereof becomes increasingly difficult as tolerances become tighter and geometric complexity is increased. In many instances, conventional fabrication techniques prove impractical or impossible for tight tolerancing and complex geometries.

Various methods have been proposed for accurately aligning attachment holes of articles to be assembled or compensating for misalignment of such holes. One such proposed method is custom or matched machining. Custom or matched machining permits the fabrication of very accurately aligned holes in a single matched set of articles to be assembled.

The use of custom and matched machining provides matched sets of articles to be assembled having accurately aligned holes. However, such matched sets do not lend themselves well to be interchanged when maintenance or repair of the articles is necessary. Further, custom and matched machining is expensive when high volumes are needed.

Another proposed method utilizes a master fixture on which all parts are fabricated. The use of a master fixture provides for interchangeability between the articles to be assembled. However, the use of a master fixture does not permit the implementation of close tolerances in some situations where the geometry of the articles is complex. Further, line to line fits necessary for maximum load transference at the point of attachment are not practical by use of a master fixture. Still further, master fixtures are expensive and require constant damage and wear monitoring and control.

Yet another proposed solution to the misalignment problem described above is to provide a device which permits the adjustment of the location of the fasteners used to assemble the articles to compensate for misalignment of the attachment holes. Such devices are shown in U.S. Pat. Nos. 1,097,185; 1,704,939; 3,866,938; 4,420,272; 4,561,796 and 4,830,529 and Australian Patent 81,766/75.

U.S. Pat. No. 1,097,185 discloses a coupling bolt combined with an integral eccentric collar which has an eccentric bore for the reception of the body of the bolt. The apparatus disclosed in U.S. Patent 1,097,185 compensates for misalignment by permitting the eccentric collar to be rotated.

The apparatus disclosed by U.S. Pat. No. 1,097,185 suffers from various disadvantages. Namely, the eccentric collar when rotated causes relative movement between the articles being assembled. Thus, exact location of the articles relative to each other is not possible. Further, movement of the eccentric collar is highly detrimental to the assembled articles when multiple eccentric collars are used and where load sharing is essential.

U.S. Pat. No. 1,704,939 discloses an eccentric bushing which is used to assemble articles wherein the eccentric bushing is disposed within a hole in one of the articles. The eccentric bushing includes a body and a hole set eccentrically in the body. Adjustments for misalignment are accomplished in the eccentric bushing disclosed by U.S. Pat. No. 1,704,939 by rotating the bushing.

The eccentric bushing disclosed by U.S. Pat. No. 1,704,939 can only accommodate limited cases of misalignment. Further, if three or more inserts are used alignment may not be possible due to insufficient degrees of freedom offered by the combined eccentric bushings. Still further, the eccentric bushing disclosed by U.S. Pat. No. 1,704,939 suffers from the same disadvantage as the apparatus disclosed by U.S. Pat. No. 1,097,185. Namely, rotation of the bushing causes relative movement between the articles being assembled. Such relative movement between the articles being assembled makes for the exact positioning of the articles relative to each other impossible.

The adjusting device disclosed in U.S. Pat. No. 3,866,938 provides an eccentric bushing similar to that disclosed in U.S. Pat. Nos. 1,097,185 and 1,704,939. Thus, the adjusting device taught by U.S. Pat. No. 3,866,938 suffers from the same disadvantages described above relative to U.S. Pat. Nos. 1,097,185 and 1,704,939.

U.S. Pat. No. 4,420,272 discloses dual eccentric bushings which are used to compensate for misalignment. The dual eccentric bushings are locked in a fixed position by the use of a snap ring.

The dual eccentric bushings disclosed by U.S. Pat. No. 4,420,272 suffers from the disadvantage of not providing simple and easy to use apparatus for fixing the position of the eccentric bushings relative to each other. The snap ring is difficult to use in areas of limited access. Also the dual eccentric bushings disclosed in U.S. Pat. No. 4,420,272 does not provide for the proper transference of load forces at the attachment points of the articles being assembled.

U.S. Pat. No. 4,561,796 provides a tamper proof clamping device which provides for radical adjustment thereof. The device disclosed by U.S. Pat. No. 4,561,796 suffers the disadvantage of being cumbersome and difficult to use. Further, the device disclosed by U.S. Pat. No. 4,561,796 does not provide for lateral alignment.

U.S. Pat. No. 4,830,529 discloses an adjustment device for fixing an object against a supporting surface wherein two sets of mutually perpendicular slides allow transverse adjustment. The device disclosed by U.S. Pat. No. 4,830,529 suffers from the disadvantage of not providing for the transference of load forces at the attachment points of the articles being assembled. Also, the device disclosed by U.S. Pat. No. 4,830,529 does not provide apparatus for securely locking the device in a fixed position relative to the articles being assembled.

Australian Patent 81,766/75 discloses a dual eccentric misalignment compensating device. The dual eccentric misalignment compensating device disclosed by Australian Patent 81,766/75 suffers from the disadvantage of not providing for the proper transference of load forces at the attachment points of the articles being assembled. In addition, Australian Patent 81,766/75 suffers from the disadvantage of requiring the use of a retention device to retain the eccentric inserts together once assembled.

DISCLOSURE OF INVENTION

The present invention overcomes the above described disadvantages of conventional systems by providing a misalignment compensating fastener insert which provides a fastener insert for adjusting the location of a fastener to compensate for misalignment in attachment holes of articles to be assembled.

A unique advantage of the present invention is that a plurality of misalignment fastener inserts according to the present invention may be used when a plurality of fasteners are used to assemble a first article to a second article without affecting the position of the articles relative to each other. Each of the misalignment fastener inserts of the present invention when used with other misalignment fastener inserts of the present invention operate independent of each other to compensate for misalignment of corresponding attachment holes.

Further, the present invention provides a misalignment compensating fastener insert that securely locks itself in a fixed position when the fastener is fastened.

Still further, the present invention provides a misalignment compensating fastener insert that properly transfers shear load forces at the attachment points of the articles being assembled.

A first embodiment of the misalignment compensating fastener insert of the present invention includes a truncated cone shaped outer body member defined around a first axis and having a tapered inner bore defined therethrough around a second axis eccentric to the first axis. The truncated cone shaped outer body member is rotatably positioned in a tapered attachment hole of a first article to be assembled. A cylindrical attachment hole is provided in a second article to be assembled corresponding to the tapered attachment hole in the first article.

A truncated cone shaped inner body member is also provided in the misalignment compensating fastener insert of the present invention. The truncated cone shaped inner body member is defined around a third axis and includes an inner bore defined therethrough around a fourth axis eccentric to the third axis. The truncated cone shaped inner body member is rotatably positioned within the tapered inner bore of the truncated cone shaped outer body member.

Eccentricity of the inner bore of the truncated cone shaped inner body member relative to the truncated cone shaped outer body member may be varied by rotating the truncated cone shaped inner body member within the truncated cone shaped outer body member and rotating the truncated cone shaped outer body member within the tapered attachment hole relative to each other. Rotating of the truncated cone shaped inner body member relative to the truncated cone shaped outer body member and rotating of the truncated cone shaped outer body member relative to the tapered attachment hole of the first article causes the adjustment of the location of the inner bore of the inner body member through which extends a fastener.

The tapered attachment hole of the first article which corresponds to the cylindrical attachment hole of the second article. Thus, rotation of the truncated cone shaped outer and inner body members relative to each other aligns the inner bore with the cylindrical attachment hole to compensate for misalignment between the cylindrical and tapered attachment holes of the articles being assembled.

Due to the tapered outer surfaces of the truncate cone shaped inner and outer body members the present invention also provides for the positive transference of shear loading forces at the attachment points of the articles to be assembled.

A second embodiment of the misalignment compensating fastener insert of the present invention is similar to the first embodiment in that it includes the truncated cone shaped outer body member having the eccentric tapered inner bore and the truncated cone shaped inner body bore rotatably positioned within the tapered inner bore of the truncated cone shaped outer body member and having the eccentric inner bore. The truncated cone shaped outer body member is rotatably positioned within a tapered attachment hole of the first article to be assembled.

The second embodiment of the misalignment compensating fastener insert of the present invention further provides snap rings which are disposed in the outer surface of the truncated cone shaped inner body member and a groove disposed in the surface of the tapered inner bore of the truncated cone shaped outer body member wherein the snap ring releasably engages the groove thereby attaching the truncated cone shaped inner body member to the truncated cone shaped outer body member.

The snap ring and the groove are provided to positively fix the position of the truncated cone shaped inner body member relative to the truncated cone shaped outer body member. The snap ring and groove also provides the advantage of attaching the truncated cone shaped inner body member to the truncated cone shaped outer body member to ease installation thereof.

A third embodiment of the misalignment compensating fastener insert of the present invention is similar to the first embodiment in that it includes the truncated cone shaped outer body member having the eccentric tapered inner bore and the truncated cone shaped inner body member rotatably positioned within the tapered inner bore of the truncated cone shaped outer body member and having the eccentric inner bore. The truncated cone shaped outer body member is rotatably positioned within a tapered attachment hole of the first article to be assembled.

The third embodiment of the misalignment compensating fastener insert of the present invention provides a counterbored surface at the inner bore of the truncated cone shaped inner body member. The counterbored surface permits the flush mounting of the head of a fastener which extends through the inner bore of the truncated cone shaped inner body member and the attachment holes of the articles being assembled. Such flush mounting is needed in environments where space is at a premium or a smoothly surface at the attachment points is desired.

BRIEF DESCRIPTION OF THE DRAWINGS

The features of the present invention which are believed to be novel are set forth with particularity in the appended claims. The invention may be best understood, however, by referring to the following description in conjunction with the accompanying drawings in which:

BEST MODE FOR CARRYING OUT THE INVENTION

Figure 1A:
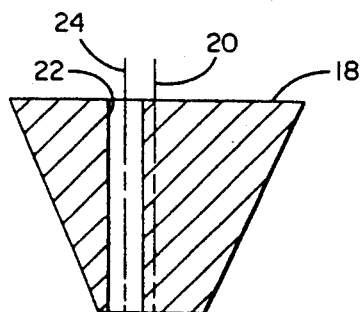
FIGS. 1a-1d illustrates a first embodiment of the misalignment compensating fastener insert of the present invention.
Figure 1B:
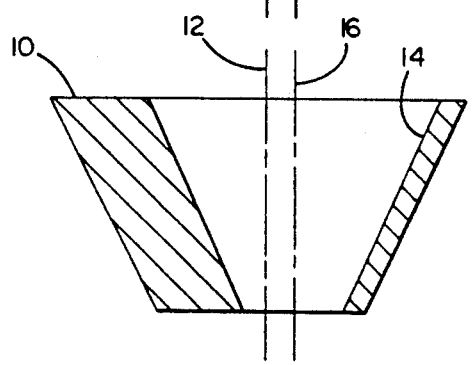

FIGS. 1a and 1b illustrate the first embodiment of the misalignment compensating fastener insert of the present invention. The first embodiment of the misalignment compensating fastener insert includes a truncated cone shaped outer body member 10 which is defined about a first axis shown by line 12. The truncated cone shaped outer body member includes a tapered inner bore 14 defined through the truncated cone shaped outer body member 10. The tapered inner bore 14 of the truncated cone shaped outer body member 10 is defined around a second axis shown by line 16. The second axis 16 is eccentric to the first axis 12.

The first embodiment of the misalignment compensating fastener insert of the present invention as shown in FIGS. 1a-1d also includes a truncated cone shaped inner body member 18 defined around a third axis shown by line 20. The truncated cone shaped inner body member 18 includes an inner bore 22 defined therethrough. The inner bore 22 has a cylindrical shape. The inner bore 22 is defined around a fourth axis shown by line 24. The fourth axis 24 is eccentric to the third axis 20.

Figure 1C:
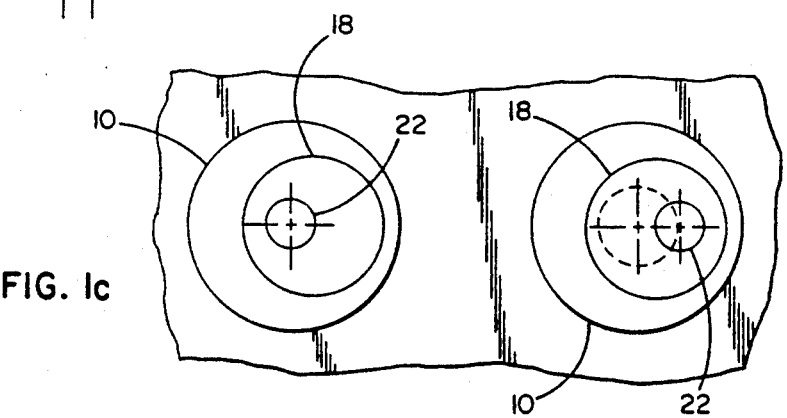
Figure 1D:
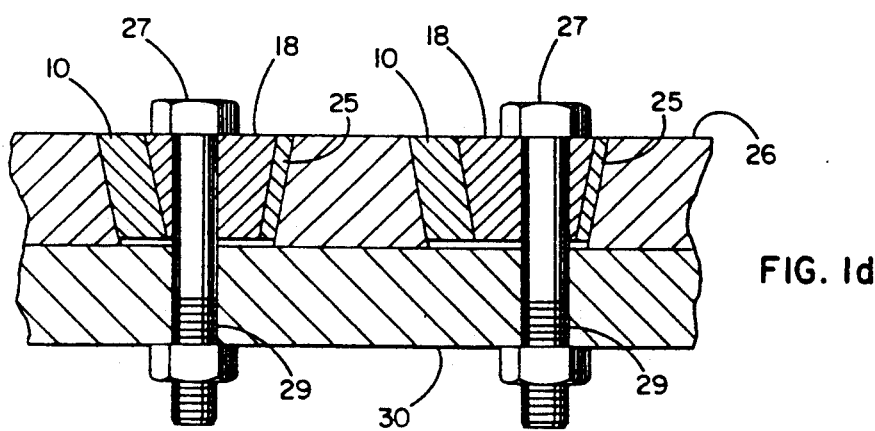

As shown in FIGS. 1c and 1d the truncated cone shaped inner body member 18 is rotatably positioned in the tapered inner bore 14 of the truncated cone shaped outer body member 10 and the truncated cone shaped outer body member 10 is rotatably positioned in a tapered attachment hole 25 of a first article 26 to be assembled.

The eccentricity of the inner bore 22 of the truncated cone shaped inner body member 18 relative to the truncated cone shaped outer body member 10 may be varied by rotating the truncated cone shaped inner body member within the truncated cone shaped outer body member 10 and rotating the truncated cone shaped outer body member 10 within the tapered attachment hole 25 relative of the first article 26 relative to each other. Rotating the truncated cone shaped inner body member 18 relative to the truncated cone shaped outer body member 10 and rotating the truncated cone shaped outer body member relative to the first article 26 causes an adjustment in the location of the inner bore 22 through which extends a fastener 27 as shown in FIG. 1d. The fastener 27 extends through the inner bore 22 of the truncated cone shaped inner body member, which effectively serves as an alignable hole for the tapered attachment hole 25 of the first article 26, and through a cylindrical attachment hole 29 of a second article 30 to be assembled to the first article 26. The adjustment of the location of the inner bore 22, aligns the inner bore 22 to the cylindrical attachment hole 29, thereby adjusting the location of the fastener 27 to compensate for misalignment between the tapered and cylindrical attachment holes 25 and 29 of the first and second articles 26 and 30 to be assembled.

Figure 2A:
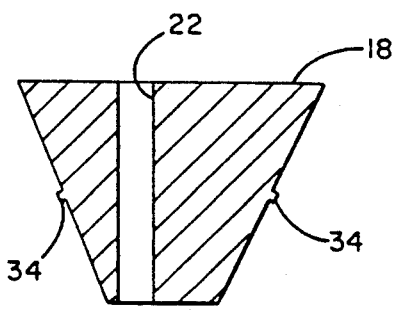
FIG. 2a-2b illustrates a second embodiment of misalignment compensating fastener insert of the present invention.
Figure 2B:
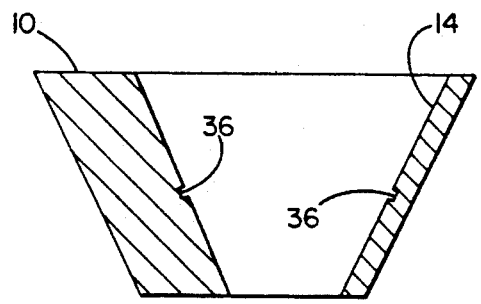

A second embodiment of the misalignment compensating fastener insert of the present invention is illustrated in FIGS. 2a-2b. The second embodiment of the misalignment compensating fastener insert of the present invention includes the truncated cone shaped outer body member 10 having the tapered inner bore 14 defined therethrough and the truncated cone shaped inner body member 18 having the inner bore 22 defined therethrough. The axes of the taper inner bore 14 of the truncated cone shaped outer body member 10 and the inner bore 22 of the truncated cone shaped inner body member are eccentrically located relative to the axes of the truncated cone shaped outer body member 10 and the truncated cone shaped inner body member 18 respectively.

The second embodiment of the misalignment compensating fastener insert of the present invention further provides a snap ring 34 which is disposed on the outer tapered surface of the truncated cone shaped inner body member 18. The snap ring 34 may extend around the complete circumference of the truncated cone shaped inner body member 18.

The second embodiment of the misalignment compensating fastener insert of the present invention further includes a groove 36 formed in the surface of the tapered inner bore 14 of the truncated cone shaped outer body member 10. The groove 36 may extend around the complete circumference of the tapered inner bore 14.

In the second embodiment when the truncated cone shaped inner body member 18 is rotatably positioned in the tapered inner bore 14 of the truncated cone shaped outer body member 10, the snap ring 34 releasably engages the groove 36 so as to positively attach the truncated cone shaped inner body member 18 to the truncated cone shaped outer body member 10. The truncated cone shaped outer body member 10 is rotatably positioned in the tapered attachment hole 25 of the first article 26.

The snap ring 34 and groove 36 permits the truncated cone shaped inner body member 18 to be fixed in a position relative to the truncated cone shaped outer body member 10. Also the snap ring 34 and groove 36 provides a unique advantage of positively attaching the truncated cone shaped inner body member 18 to the truncated cone shaped outer body member 10 to ease the installation thereof. Thus, the snap ring 34 and groove 36 prevents the inadvertent dropping of one or both of the members during installation.

Figure 3:
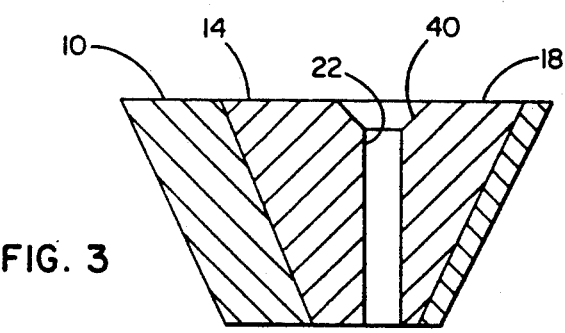
FIG. 3 illustrates a third embodiment of the misalignment compensating fastener insert of the present invention.

A third embodiment of the misalignment compensating fastener insert of the present invention is illustrated in FIG. 3. The third embodiment of the misalignment compensating fastener insert of the present invention includes the truncated cone shaped outer body member 10 having the tapered inner bore 1 and the truncated cone shaped inner body member 18 having the inner bore 22.

The axes of the tapered inner bore 14 and the inner bore 22 are eccentric relative to the axes of the truncated cone shaped outer body member 10 and truncated cone shaped inner body member 18 respectively.

The third embodiment of the misalignment compensating fastener insert of the present invention further provides a counterbored surface 40 at the inner bore 22 of the truncated cone shaped inner body member 18. The counterbored surface 40 permits the flush mounting of the head of a fastener during the assembly of articles 26 and 30.

The flush mounting of the head of a fastener is required in some situations where space is at a premium or a smooth surface at the point of attachment of the articles is desired.

The first, second and third embodiments of the misalignment compensating fastener insert of the present invention aids in the distribution and transference of shear loads at the attachment points of the articles being assembled due to the tapered outer surfaces of the truncated cone shaped inner and outer body members and the tapered surface of the tapered attachment hole of the first article 26.

Also, the first, second and third embodiment of the misalignment compensating fastener insert of the present invention offers a wide range of locations to which a fastener may be adjusted to compensate for misalignment due to the use of the inner and outer body members. Each misalignment fastener insert can be individually adjusted to compensate for misalignment of attachment holes without affecting any other misalignment compensating fastener insert which is used in the article.

Further, the use of the inner and outer body members in the first, second and third embodiments of the misalignment compensating fastener insert of the present invention, permits exact positioning of the articles being assembled in that the misalignment compensating fastener inserts of the present invention accomplishes the adjustment of the location of the fasteners without corresponding relative movement between the articles being assembled.

While the present invention has been described in terms of its preferred embodiments, it should be understood that numerous modifications may be made thereto without departing from the spirit and scope of the invention as defined in the appended claims. For example, the present invention may be used in any application such as positioning bearing liners, lathe tail stocks and cutting tools that require adjustments to compensate for misalignments. It is intended that all such modifications fall within the scope of the appended claims.

We claim:

1. A misalignment compensating fastener insert for compensating for misalignments in attachment holes of articles to be assembled, comprising:
    a truncated cone shaped outer body member defined around a first axis and having a tapered inner bore defined therethrough around a second axis eccentric to said first axis, said truncated cone shaped outer body member being rotatably positioned in a tapered attachment hole of a first article, said tapered attachment hole corresponds to a cylindrical attachment hole of a second article;
    a truncated cone shaped inner body member defined around a third axis and having an inner bore defined therethrough around a fourth axis eccentric to said third axis;
    a groove formed in the surface of said tapered inner bore of said truncated cone shaped outer body member; and
    a snap ring formed on the outer surface of said truncated cone shaped inner body member;
    wherein said truncated cone shaped inner body member is rotatably positioned within said tapered inner bore of said truncated cone shaped outer body member and said snap ring releasably engages said groove to attach said truncated cone shaped inner body member to said truncated cone shaped outer body member; and
    wherein eccentricity of said inner bore of said truncated cone shaped inner body member relative to said truncated cone shaped outer body member is varied by rotating said truncated cone shaped inner body member and said truncated cone shaped outer body member relative to each other, thereby permitting said inner bore to be aligned with said cylindrical attachment hole to compensate for misalignments between said tapered attachment hole and said cylindrical attachment hole.

2. A misalignment compensating fastener insert according to claim 1 wherein a counterbored surface is defined in said inner bore of said truncated cone shaped inner body member.

3. A misalignment compensating fastener insert for compensating for misalignments in attachment holes of articles to be assembled, comprising:
    a truncated cone shaped outer body member defined around first axis and having a tapered inner bore defined therethrough around a second axis eccentric to said first axis, said truncated cone shaped outer body member being rotatably positioned in a tapered attachment hole of a first article, said tapered attachment hole corresponds to a cylindrical attachment hole of a second article;
    a truncated cone shaped inner body member defined around a third axis and having an inner bore defined therethrough around a fourth axis eccentric to said third axis;
    a counterbored surface defined in said inner bore of said truncated cone shaped inner body member;
    wherein said truncated cone shaped inner body member is rotatably positioned within said tapered inner bore of said truncated cone shaped outer body member;
    wherein eccentricity of said inner bore of said truncated cone shaped inner body member relative to said truncated cone shaped outer body member is varied by rotating said truncated cone shaped inner body member and said truncated cone shaped outer body member relative to each other, thereby permitting said inner bore to be aligned with said cylindrical attachment hole to compensate for misalignments between said tapered attachment hole and said cylindrical attachment hole;
    a groove formed in the surface of said tapered inner bore of said truncated cone shaped outer body member; and
    a snap ring formed on the outer surface of said truncated cone shaped inner body member for releasably engaging said groove, thereby releasably attaching said truncated cone shaped inner body member to said truncated cone shaped outer body member.

* * * * *